March 2, 1954  W. T. GRANT  2,670,729
APPARATUS AND METHOD FOR RECORDING GRAPHICALLY
BALANCE CHARACTERISTICS
Filed Sept. 11, 1950  2 Sheets-Sheet 1
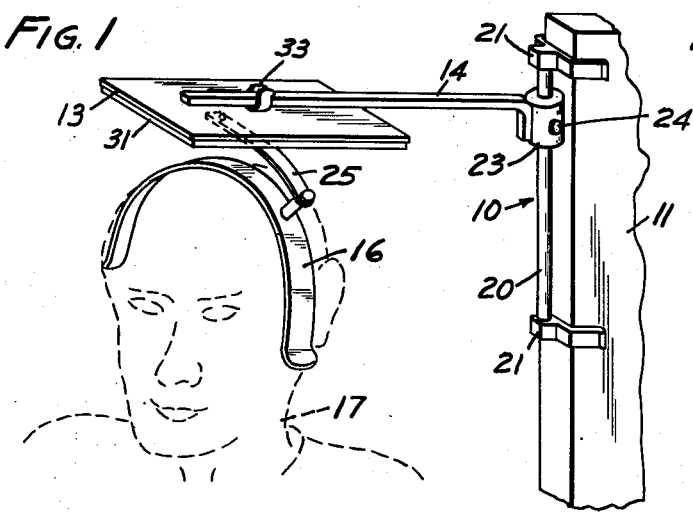
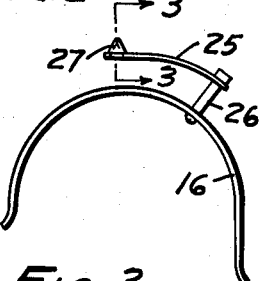
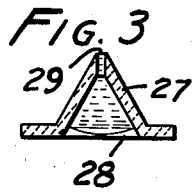
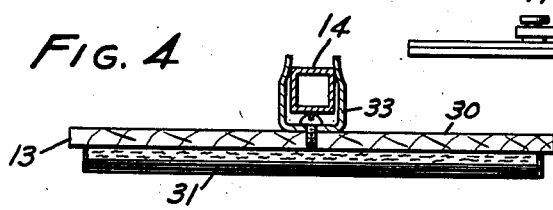
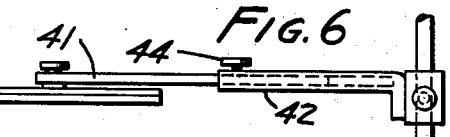
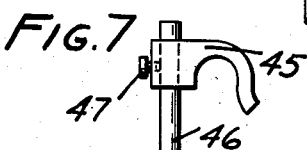
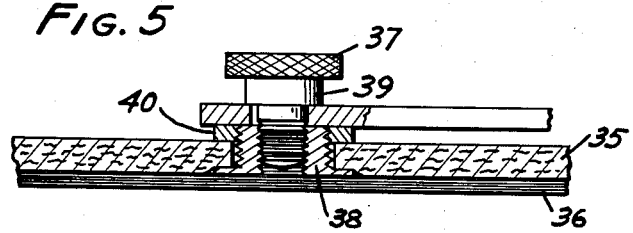
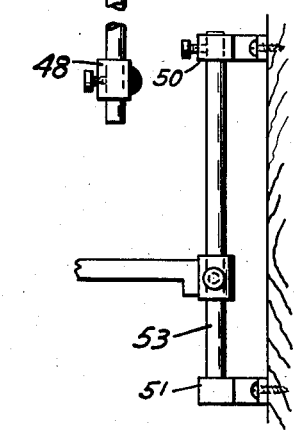
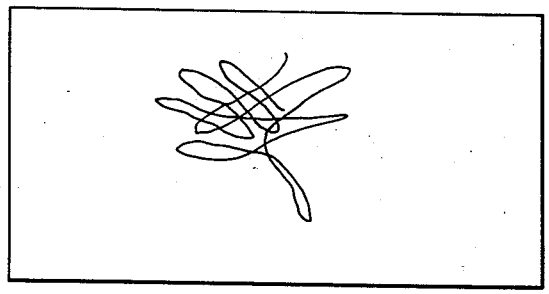
INVENTOR.
WILLIAM T. GRANT
BY James B. Christie
ATTORNEY.

March 2, 1954  W. T. GRANT  2,670,729
APPARATUS AND METHOD FOR RECORDING GRAPHICALLY
BALANCE CHARACTERISTICS
Filed Sept. 11, 1950  2 Sheets-Sheet 2

INVENTOR.
WILLIAM T. GRANT
BY James B. Christie
ATTORNEY.

Patented Mar. 2, 1954

2,670,729

UNITED STATES PATENT OFFICE 2,670,729

APPARATUS AND METHOD FOR RECORDING GRAPHICALLY BALANCE CHARACTERISTICS

William T. Grant, Pasadena, Calif.

Application September 11, 1950, Serial No. 184,150

1 Claim. (Cl. 128—2)

This invention provides method and apparatus for recording graphically the balance characteristics of an individual.

The medical profession uses a test, known as the Romberg test, to reveal disturbances of equilibrium. This test proceeds on the premises that when an individual stands with his feet in close approximate position and away from any support, the degree and character of involuntary movement (i. e. balance characteristics) will reveal the absence or presence of equilibrium disturbance. This test is very useful in diagnostic work in recognizing injuries to the brain, tumors of the brain and various types of brain disorders. The Romberg test could be used in other fields (e. g. by the police in detecting intoxication and in granting driver's licenses), and with greater utility in the physician's office, if suitable apparatus and techniques were available.

I provide apparatus and methods which furthers the application of the Romberg test to all fields and which will increase the usefulness of the test in the diagnostician's office in that by the practice of my methods and the use of the apparatus permanent records may be accurately and quickly made. The methods are easily and readily performed, even by unskilled personnel, and the apparatus of the invention is inexpensive to construct and rugged in construction.

If one aspect the invention contemplates a method of performing the Romberg test which comprises supporting a recording surface above the head of an individual and charting or making on this surface a record of the individual's balance characteristics by means of a marker carried on the individual's head. Preferably, the recording is carried on for a predetermined interval of time, say 30 seconds. In one procedure the recording surface is held in a fixed position, any excursions of the recorded trace being due solely to movement of the individual's head. Alternatively, the recording surface may be caused to move at a uniform rate while charting proceeds, giving a record of the individual's balance characteristics charted against time. In this latter method, if balance of the individual be upset, as by an artificial stimulus, the record obtained will reveal the disturbance as well as the manner of recovery.

In one embodiment the apparatus of my invention includes means for supporting a recording surface above the head of an individual, and means worn on the head of the individual for marking on this recording surface a record of his balance characteristics.

Preferably, the means for marking comprises a removable spring head clamp and a flexible pen fastened to the clamp which contacts the recording surface. Conveniently, the recording surface is carried by a horizontal arm of a bracket which is either fixed or removably attached to a support, say an open door or a wall. Means are provided for raising and lowering the recording surface to compensate for differences in height.

The subject under examination stands under the recording surface in the Romberg position, i. e. with his feet stationary and generally side by side, with the head clamp in position and the flexible pen contacting the recording surface. The pen and recording surface are maintained in contact for a given interval, say 30 seconds.

A diagnostician by studying the record obtained can readily spot an equilibrium disturbance. The record, being of a permanent nature, may be saved for future comparison with records made at earlier or later times in the course of the clinical investigation.

In the case of an intoxication suspect, a record is made while he is in the intoxicated state and another record later after sobering up. The two records present good evidence of intoxication and assure that the abnormal characteristics of the first record are not attributable to some disorder other than intoxication, such as organic disease.

The invention will be clearly understood from the following detailed description taken in conjunction with the accompanying drawing in which:

Fig. 1 is a perspective view of a preferred form of the invention;

Fig. 2 is an elevation of a head clamp and recording pen of the apparatus of Fig. 1, with the pen depressed into its recording position;

Fig. 3 is a cross section through the recording pen of Fig. 2 along line 3—3 of that figure;

Fig. 4 is a cross section through a recording pad of the apparatus of Fig. 1;

Fig. 5 is a cross section through another embodiment of the recording pad;

Figs. 6, 7 and 8 are fragmentary elevations of still other modifications of the apparatus of the invention;

Fig. 9 is an illustration of a record obtained through the use of the apparatus of the invention.

Figure 10:
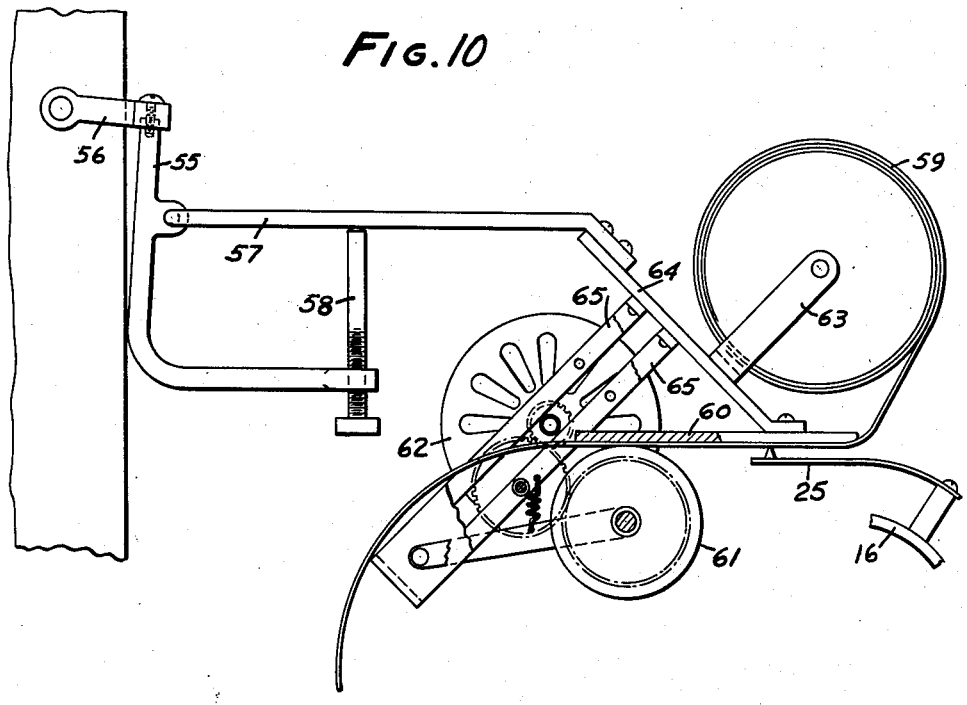
Fig. 10 is a fragmentary side elevation of still another form of the apparatus of the invention, provided with means for moving a recording surface at a uniform rate past the head of a subject.

The apparatus illustrated in Figs. 1, 2, 3 and 4 includes a bracket 10 fastened to the edge of a door 11, a recording pad 13 supported on a horizontal arm 14 of the bracket, and a head clamp 16 worn by an individual 17.

The bracket has a vertical rod member 20 which is removably held to the door by two U-shaped spring clamps 21 mounted at opposite ends of the rod. The horizontal arm has fastened to its inner end a plastic annular member 23 which is slidably mounted on the rod and which may be locked thereto by a set screw 24. The horizontal arm is movable vertically along the rod permitting vertical adjustment of the recording pad to accommodate individuals of different heights.

The head clamp is a relatively thin metal strap and may be worn by individuals having different head sizes. A straight flexible pen 25, made preferably of Celluloid or the like, is fastened to the clamp by a short mounting piece 26 which is offset such a distance from the midpoint of the clamp that when the point of the pen contacts the overlying recording pad, the pen point is positioned directly over the apex of the subject's head. The point of the pen (Fig. 3) consists of a hollow cone 27 having an open bottom 28 and a small hole 29 in its apex. Ink is retained in this open bottom cone by surface tension.

The recording pad (Fig. 4) has a relatively stiff backing member 30 with a pad of paper 31 held to its under side. Three of the four edges of the several sheets of paper making up the pad are bonded together. The bottom sheet may be readily removed from the pad by grasping its unattached edge and tearing the sheet loose. A U-shaped spring clamp 33 fastened to the top side of the backing member removably holds the recording pad to the horizontal arm.

The recording pad of Fig. 5 also has a relative stiff backing member 35 and several sheets of paper 36 bonded to the under side of the backing member and together in the same manner as the pad described above. An internally threaded and upwardly opening grommet 38 is mounted in the backing member and receives a set screw 39 which extends through a hole of the horizontal arm into the grommet, holding the pad to the arm. The upper outside circumference of the grommet is threaded to receive a lock nut 40 which is disposed between the pad and the horizontal arm. The set screw is provided with a knurled head 37 to facilitate screwing. Both of these pads are expendable, being purposely made inexpensive with the thought they may be discarded and replaced when used up.

The horizontal arm of the bracket of Fig. 6 has two telescoping members 41, 42 which permits horizontal adjustment of the record pad relative to the wall. By tightening a thumb screw 44, the two telescoping members may be locked together.

The apparatus of Fig. 7 is particularly adapted to portable use and includes an inward projecting hook 45 which is slidably held to a vertical rod 46 by a set screw 47. The rod has at its lower end a vertical adjustable stop 48. This particular modification is particularly adapted for use with a squad car of a police force, with the hook being placed over the top of an open door of the car. The lower stop engages the door at a point therebelow, spacing the rod from the door in a vertical plane.

The apparatus of Fig. 8 is a type adapted for permanent installation in a physician's office. An upper clamp 50 and a lower clamp 51, both of which are fastened to the wall by screws at opposite ends of a vertical rod 53, support the horizontal arm of the bracket. The horizontal arms of the three modifications are vertically adjustable as is the arm of the apparatus of Fig. 1.

In recording the balance characteristics of an individual the head clamp is placed on his head and he is instructed to stand beneath the pad of paper with his feet in close approximate position and to stand as still as possible. The horizontal arm with the recording pad is lowered until the pad contacts the point of the flexible pen. The pen and paper are held in contact with each other for a predetermined interval of time, say 30 seconds, giving a record of the type illustrated in Fig. 9. At the end of this period, the pad is moved upward away from the pen.

The apparatus of Fig. 10 records the balance characteristics of an individual against time. The apparatus includes an L-shaped bracket 55 held to the edge of an open door by a C-clamp 56, with one leg of the L bracket extending outwardly from the edge of the door and the other leg extending upwardly along the edge of the door. An arm 57 hinged to the upwardly extending leg of the L bracket is raised or lowered to a horizontal position through the use of an elevating screw 58. The elevating screw is threaded through the outer end of the outwardly extending leg of the L-bracket.

A roll of paper 59 and a horizontal plate 60 together with an electric motor 62 are held to the outer end of the arm 57 by a downwardly and outwardly sloping plate 64. The roll of paper is fastened by an upwardly opening U-bracket 63 to the upper side of the plate 64 away from the door and the motor is supported from the under side by two downwardly sloping parallel arms 65. The horizontal plate 60 is affixed to the outer and lower end of the plate 64 and extends from this end towards the door along one side of the motor in a plane parallel to the arm 57. The paper of the roll is threaded along the under side of the horizontal plate and moved along the length of this plate by two friction rubber driving wheels 61 (only one shown) which are coupled through reduction gearing to the driving shaft of the electric motor. The two wheels which are mounted on a common shaft are preferably spring loaded into engagement with the plate 60.

In making a record of the balance characteristics, the individual as before stands beneath the apparatus with the pen point of the head clamp 16 contacting the paper at a point along the length of the plate 60 outward from the two friction wheels. The motor is energized and the paper is pulled along the plate by the two wheels, making a record of the balance characteristics against time.

This apparatus is particularly useful in recording data of the time required for an individual to regain his balance. The loss of balance may be brought about by a mild electrical stimulation in the region of the labyrinth or by tipping a platform upon which the subject is standing. The record obtained would also reveal the degree of loss of balance.

I claim:

An apparatus for recording graphically the balance characteristics of a standing individual for brain disorder diagnostic work, comprising a vertical wall bracket adapted for attachment to a wall, a horizontal arm mounted on said bracket, means for vertically adjusting said arm on said bracket to accommodate individuals of varying heights, a recording surface mounted on said arm in a horizontal and downwardly disposed manner, means for horizontally adjusting the position of said recording surface on said horizontal arm for accommodating individuals at varying distances from said wall bracket, marking means having a U-shaped resilient clamp shaped to be secured to the head of the individual, a mounting piece extending upwardly from the resilient member, a flexible member, connected to said mounting piece, and a hollow cone marking point connected to said flexible member at a position such that it is, when worn, directly over the apex of the individual's head, said cone being of such size as to retain recording liquid by surface tension, the apex of the cone being in slidable contact with said recording surface to accomplish recordation of movement thereof when said marking means is worn by an individual.

WILLIAM T. GRANT.

References Cited in the file of this patent

UNITED STATES PATENTS

| Number | Name | Date |
|---|---|---|
| 2,052,789 | Mors et al. | Sept. 1, 1936 |
| 2,192,435 | Downing | Mar. 5, 1940 |
| 2,324,672 | Bierman et al. | July 20, 1943 |
| 2,508,146 | D'Elia | May 16, 1950 |

FOREIGN PATENTS

| Number | Country | Date |
|---|---|---|
| 440,342 | France | May 2, 1912 |